United States Patent [19]

Kurkov

[11] Patent Number: 4,599,399
[45] Date of Patent: Jul. 8, 1986

[54] PROCESS FOR THE PREPARATION OF POLY[3,6-N-SUBSTITUTED CARBAZOLE-1,3,4-OXADIAZOLE-2,5-DIYL] FROM N-SUBSTITUTED CARBAZOLE-3,6-DICARBOXYLIC ACID

[75] Inventor: Victor P. Kurkov, San Rafael, Calif.

[73] Assignee: Chevron Research Company, San Francisco, Calif.

[21] Appl. No.: 664,829

[22] Filed: Oct. 25, 1984

[51] Int. Cl.$^4$ .................... C08G 73/06; C08G 73/08
[52] U.S. Cl. .................................. 528/313; 528/327; 528/363
[58] Field of Search ................ 528/327, 313, 363

[56] References Cited

U.S. PATENT DOCUMENTS 3,734,893  5/1973  Studinka et al. .................... 528/363

Primary Examiner—Harold D. Anderson
Attorney, Agent, or Firm—T. G. DeJonghe; C. J. Caroli

[57] ABSTRACT

A one-step process for the preparation of poly[3,6-N-substituted carbazole-1,3,4-oxadiazole-2,5-diyl] which comprises polymerizing N-substituted carbazole-3,6-dicarboxylic acid, wherein the carbazole nitrogen is substituted with lower alkyl of 1 to 6 carbon atoms or phenyl, with a 0 to 30% molar excess of hydrazine or a hydrazine salt of a non-oxidizing acid in the presence of polyphosphoric acid.

8 Claims, No Drawings

PROCESS FOR THE PREPARATION OF POLY[3,6-N-SUBSTITUTED CARBAZOLE-1,3,4-OXADIAZOLE-2,5-DIYL] FROM N-SUBSTITUTED CARBAZOLE-3,6-DICARBOXYLIC ACID

BACKGROUND OF THE INVENTION

The present invention is concerned with a one-step process for the preparation of poly[3,6-N-substituted carbazole-1,3,4-oxadiazole-2,5-diyl]. More specifically, the present invention involves the one-step polymerization of N-substituted carbazole-3,6-dicarboxylic acid with hydrazine or a hydrazine salt of a non-oxidizing acid in the presence of polyphosphoric acid to provide the desired carbazole-oxadiazole copolymer.

It is known in the art that poly[3,6-N-ethyl carbazole-1,3,4-oxadiazole-2,5-diyl] can be prepared by a multistep polymerization process. Thus, N. D. Negodyaev and T. P. Sokolova in Chemical Abstracts: 88-74564a (deposited document 1975, VINITI 3390-75) describe a two-step route wherein the first step involves the polymerization of a mixture of N-ethylcarbazole-3,6-dicarboxylic acid chloride and the corresponding dihydrazide to a polyhydrazide. The second step involves a cyclodehydration to the polyoxadiazole. These authors further teach that attempts at a one-step process were unsuccessful.

Poly[3,6-N-substituted carbazole-1,3,4-oxadiazole-2,5-diyl] is a useful precursor for the production of electrically conducting polymers as described in commonly assigned U.S. patent application Ser. No. 664,892, filed concurrently herewith, entitled "Carbazole-Oxadiazole Electroactive Polymers".

SUMMARY OF THE INVENTION

The present invention provides an improved process for the preparation of poly[3,6-N-substituted carbazole-1,3,4-oxadiazole-2,5-diyl] which comprises polymerizing N-substituted carbazole-3,6-dicarboxylic acid, wherein the carbazole nitrogen is substituted with lower alkyl of 1 to 6 carbon atoms or phenyl, with a 0 to 30% molar excess of hydrazine or a hydrazine salt of a non-oxidizing acid in the presence of polyphosphoric acid at a temperature in the range of about 120° C. to 180° C. and a pressure in the range of about 1 to 50 atmospheres.

Among other factors, the present invention is based on my discovery that a high molecular weight polymer of 3,6-N-substituted carbazole-1,3,4-oxadiazole-2,5-diyl can be successfully produced in good yield and selectivity by a novel one-step process which involves reacting N-substituted carbazole-3,6-dicarboxylic acid with hydrazine or a hydrazine salt of a non-oxidizing acid in the presence of polyphosphoric acid.

By comparison, it has been found that hydrazine salts of oxidizing acids, such as hydrazine sulfate, do not provide high molecular weight polymer when reacted with N-substituted carbazole-3,6-dicarboxylic acid.

DETAILED DESCRIPTION OF THE INVENTION

Poly[3,6-N-substituted carbazole-1,3,4-oxadiazole-2,5-diyl] is a copolymer of N-substituted carbazole and oxadiazole units which may be represented by the following structural formula:

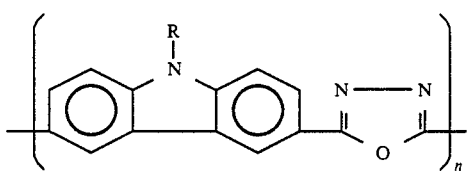

wherein R is lower alkyl of 1 to 6 carbon atoms or phenyl and n is the degree of polymerization. In general, n will be an integer ranging from about 10 to 1,000, preferably from about 30 to 1,000. Preferably, R is ethyl.

The one-step process of the present invention utilizes as a starting material, N-substituted carbazole-3,6-dicarboxylic acid having the formula:

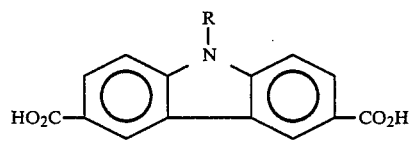

wherein R is as described hereinabove. This starting material may be readily obtained by known techniques as described by Y. Hagai and C. Huang in the Bulletin of the Chemical Society of Japan, Vol. 38(6), p. 951 (1965). According to this procedure, N-substituted carbazole is acetylated with acetyl halide or acetic anhydride to give the 3,6-diacetyl derivative, which is subsequently oxidized with an appropriate amount of sodium hypochlorite to provide N-substituted carbazole-3,6-dicarboxylic acid.

The N-substituted carbazole-3,6-dicarboxylic acid is reacted with a 0 to 30% molar excess of hydrazine or a hydrazine salt of a non-oxidizing acid. The reaction is carried out in the presence of polyphosphoric acid, which functions both as a solvent and a catalyst. Preferably, a 5 to 15% molar excess of hydrazine or hydrazine salt is employed.

Suitable hydrazine salts of non-oxidizing acids include hydrazine hydrochloride, hydrazine hydrobromide, hydrazine phosphate and hydrazine oxalate. The preferred hydrazine salt is hydrazine hydrochloride.

As noted hereinabove, hydrazine salts of oxidizing acids, such as hydrazine sulfate, hydrazine nitrate and hydrazine perchlorate, are unsuitable for use in the present process as they do not provide high molecular weight polymer. A relatively high molecular weight polymer is required for making articles such as free-standing films, and the like.

The polymerization reaction is generally carried out at a temperature of about 120° to 180° C., and preferably at about 130° C. to 150° C. The reaction pressure is normally about 1 to 50 atmospheres, preferably about 1 to 10 atmospheres, and more preferably, 1 atmosphere. The reaction time will generally vary from about 2 to about 25 hours, although longer reaction times may be utilized.

The polymer thus obtained is isolated by coagulation in water, followed by filtration. The product is thoroughly washed with water and then continuously extracted with methanol or a like solvent, such as ethanol, acetone, tetrahydrofuran, and the like.

Subsequent to polymerization, articles such as fibers, ribbons, or free-standing films may be cast from solution. The solution is formed by dissolving the desired polymer in a solvent which consists of sulfuric acid, formic acid, methanesulfonic acid, or polyphosphoric acid. The solution temperature is generally from about 20° C. to about 100° C. The polymers are coagulated into solid shapes such as fibers, ribbons, or free-standing films in a basic coagulation bath. For free-standing films, the polymers are fabricated from solutions containing about 2 to 25% polymer dissolved in the solvent. At concentrations which exceed 10%, the cast films take on an anisotropic morphology. An amine, for example triethylamine, dissolved in a protonic solvent such as water, and preferably ethyl alcohol, comprises the coagulation bath. The bath is maintained at a lower temperature than the dissolution temperature of the polymer in the solvent. Usually room temperature is selected as the operating temperature of the coagulation bath. The fabricated articles are dried. Elevated temperatures, usually 60° C., and reduced pressure accelerate the drying process. Drying is continued until no further weight loss is observed.

Alternatively, films are cast into water, comprising the coagulation bath, followed by neutralization in aqueous bicarbonate. Neutralized films are washed in water and dried at elevated temperatures, 60°–100° C., under reduced pressure.

The following examples are provided to illustrate the invention in accordance with the principles of this invention but are not to be construed as limiting the invention in any way except as indicated by the appended claims.

EXAMPLES

Example 1

Preparation of 3,6-Diacetyl-N-Ethyl Carbazole

Finely powdered anhydrous aluminum chloride (100 g), N-ethylcarbazole (70 g), and 500 ml dry carbon disulfide were placed in a 1-liter, three-necked flask equipped with mechanical stirrer and reflux condenser. Ninety grams of acetyl chloride were added dropwise with stirring. The addition generated enough heat to keep the solvent at reflux. The mixture was heated at reflux during an additional hour and the solvent distilled off. 200 ml 1N HCl and 200 ml ice were added cautiously to the flask. The solid product was removed and washed with water. The product was recrystallized twice from ethyl acetate to give 55 g of 3,6-diacetyl-N-ethylcarbazole melting at 184°–190° C.

Example 2

Preparation of N-Ethylcarbazole-3,6-Dicarboxylic Acid

Nineteen grams of the 3,6-diacetyl-N-ethylcarbazole from Example 1 was dissolved in 800 ml pyridine and added to 400 ml of 5% aqueous sodium hydroxide in a 6-liter Erlenmeyer flask. While cooling the mixture in ice, 1429 ml of 5% sodium hypochlorite (bleach) was added. The reaction was allowed to stir 3.5 hours at room temperature. A concentrated solution of sodium bisulfite was added until no hypochlorite remained (starch-iodine test). The basic solution was neutralized with concentrated HCl and the precipitated diacid filtered. The yield of N-ethylcarbazole-3,6-dicarboxylic acid was 13.12 g.

Elemental analysis was as follows. Calculated for $C_{16}H_{13}NO_4$: %C, 67.84; %H, 4.63; %N, 4.94. Found: %C, 67.60; %H, 4.64; %N, 4.88.

Example 3

Preparation of Poly[3,6-N-Ethylcarbazole-1,3,4-Oxadiazole-2,5-Diyl]

The N-ethylcarbazole-3,6-dicarboxylic acid (1.0885 g, 0.0038 mole) from Example 2 and hydrazine hydrochloride (0.2764 g, 0.0040 mole) was stirred together at 140° C. in 18.45 g of polyphosphoric acid. The polymerization was carried out under anhydrous conditions in a dry box. After 22 hours, the dark, rubbery polymer solution was scraped out and stirred with 500 ml cold water. The solid polymer was washed with water and methanol. The crude polymer was extracted overnight with methanol and dried. The polymer product was obtained in about 90% yield. Films were cast from methanesulfonic acid and also from trifluoromethanesulfonic acid.

Elemental analysis of the polymer was as follows. Calculated for $(C_{16}H_{11}N_3O)_n$: %C, 73.55; %H, 4.24; %N, 16.08. Found: %C, 71.44; %H, 4.34; %N, 15.85. The intrinsic viscosity of the polymer measured in methanesulfonic acid at 20° C. was 1.01 dl/g.

What is claimed is:

1. A process for the preparation of poly[3,6-N-substituted carbazole-1,3,4-oxadiazole-2,5-diyl] which comprises polymerizing N-substituted carbazole-3,6-dicarboxylic acid, wherein the carbazole nitrogen is substituted with lower alkyl of 1 to 6 carbon atoms or phenyl, with a 0 to 30% molar excess of hydrazine or a hydrazine salt of a non-oxidizing acid in the presence of polyphosphoric acid at a temperature in the range of about 120° C. to 180° C. and a pressure in the range of about 1 to 50 atmospheres.

2. The process according to claim 1, wherein N-ethylcarbazole-3,6-dicarboxylic acid is polymerized to poly[3,6-N-ethylcarbazole-1,3,4-oxadiazole-2,5-diyl].

3. The process according to claim 1, wherein the polymerization is carried out at a temperature in the range of about 130° C. to 150° C.

4. The process according to claim 1, wherein the polymerization is carried out at a pressure in the range of about 1 to 10 atmospheres.

5. The process according to claim 1, wherein a 5 to 15% molar excess of hydrazine or hydrazine salt of a non-oxidizing acid is employed.

6. The process according to claim 1, wherein the polymerization is carried out at a reaction time of about 2 to about 25 hours.

7. The process according to claim 1, wherein the hydrazine salt of a non-oxidizing acid is selected from the group consisting of hydrazine hydrochloride, hydrazine hydrobromide, hydrazine phosphate and hydrazine oxalate.

8. The process according to claim 7, wherein the hydrazine salt of a non-oxidizing acid is hydrazine hydrochloride.

* * * * *